United States Patent Office 2,788,344
Patented Apr. 9, 1957

2,788,344
METALLIFEROUS MONOAZO-DYESTUFFS

Jakob Brassel, Basel, Switzerland, assignor to Ciba Limited, Basel, Switzerland, a Swiss firm No Drawing. Application October 5, 1953,
Serial No. 384,315

Claims priority, application Switzerland October 15, 1952

4 Claims. (Cl. 260—151)

This invention is based on the observation that valuable new metalliferous monazo-dyestuffs can be made by treating a monazo-dyestuff of the general formula 1)
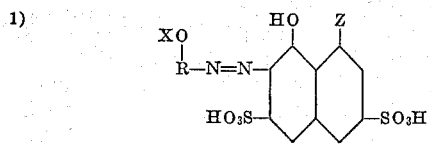

in which R represents a benzene residue free from sulfonic and carboxylic acid groups which is bound to the azo-linkage in orthoposition relatively to the XO-group and contains no nitro group in para-position relatively to the XO-group, X represents a hydrogen atom or an alkyl group, and Z represents a sulfonic acid or sulfonic acid amide group, with an agent yielding metal and, when X is an alkyl group, under conditions such that the latter group is split off.

The monoazo-dyestuffs of the Formula I used as starting materials are also new and can be made by coupling a diazotized 2-amino-1-hydroxy- or -alkoxy-benzene, which is free from sulfonic acid and carboxylic acid groups and contains no nitro group in the 4-position, with a coupling component of the general formula (2)
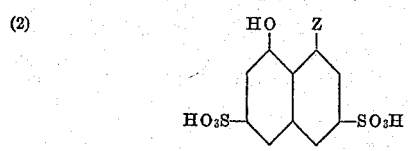

in which Z has the meaning given above.

As coupling components of the above Formula 2 there come into consideration, for example, 1-hydroxy-naphthalene-3:6-disulfonic acid-8-sulfonic acid amide, 1-hydroxy-naphthalene-3:6 - disulfonic acid - 8 - sulfonic acid methyl- or phenyl-amide. Especially valuable results are obtained with such monoazo-dyestuffs prepared from 1-hydroxy-naphthalene-3:6:8-trisulfonic acid.

As 2-amino-1-hydroxy- or -alkoxy-benzenes, which are free from sulfonic acid and carboxylic acid groups and contain no nitro group in the 4-position, for use in the preparation of the monoazo-dyestuffs of the Formula 1 serving as starting materials in the present process, there come into consideration those which are free from further substituents, such as 2-aminophenol or 2-amino-anisole, and also those which besides the amino and the hydroxy or alkoxy group contain further substituents such as sulfonic acid amide groups or acylamino groups (for example, an acetylamino group) and, if desired, also a nitro group in the 5- or 6-position, but advantageously substituents free from nitrogen, such as sulfone groups (for example, a phenyl-sulfone or methyl-sulfone group), alkyl groups (for example, a methyl group), and above all halogen atoms (for example, chlorine) or alkoxy groups (for example, a methoxy group). The alkoxy group which may, if desired, be present in the 1-position of these components is advantageously a lower alkoxy group, for example, a methoxy or ethoxy group.

As examples of diazo-components of the above kind there may be mentioned: 2-amino-1-hydroxybenzene-4-sulfonic acid amide and the corresponding N-substituted amides, 2-amino-1:4-dimethoxybenzene - 5 - sulfonic acid amide and the corresponding N-substituted amides, 5-nitro-4-methyl-2 - amino - 1 - hydroxybenzene, 5-nitro-2-amino-1-hydroxy- or -methoxybenzene, 4-chloro-6-acetylamino-2-amino-1-hydroxybenzene, 6 - nitro - 4 - acetylamino-2-amino - 1 - hydroxybenzene, 5 - nitro-4-chloro-2-amino-1-hydroxybenzene, 2-amino-1-hydroxybenzene - 4-methyl sulfone, 4-amino-3-hydroxy-diphenyl-sulfone, 2-amino - 1 - hydroxy- or -methoxybenzene, 4 - methyl - 2-amino-1-hydroxy- or -methoxybenzene, 4:6-dichloro-2-amino-1-hydroxybenzene, 3:4:6 - trichloro-2-amino-1-hydroxybenzene, and above all 4-chloro-2-amino-1-hydroxy-or -methoxybenzene, 1:4-dimethoxy - 5 - chloro-2-aminobenzene or 1:4-diethoxy-5-chloro-2-aminobenzene and 1:4-dimethoxy-2-aminobenzene or 1:4-diethoxy-2-aminobenzene.

Among the monoazo-dyestuffs serving as starting materials for the present process especially valuable are those which correspond to the general formula (3)
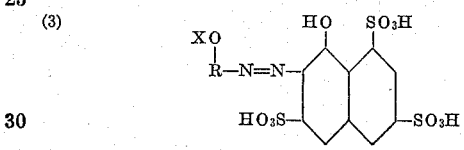

in which X represents a hydrogen atom or an alkyl group, and R represents a benzene radical free from substituents imparting solubility which is bound to the azo-linkage in ortho-position relatively to the XO-group, and which contains in para-position relatively to the XO-group a hydrogen or halogen atom or an alkoxy group, and above all those of the formula

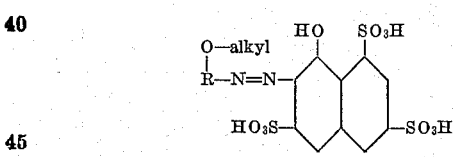

in which R represents a benzene radical free from substituents imparting solubility in water which is bound to the azo linkage in ortho-position relatively to the —O— alkyl group and contains a chlorine atom or an alkoxy group in para-position relatively to the —O— alkyl group.

The aforesaid amines may be diazotized in a manner in itself known, for example, with the aid of sodium nitrite and hydrochloric acid.

The coupling may also be carried out in a manner in itself known, for example, in an alkaline medium, for example, a medium rendered alkaline with an alkali carbonate or alkali hydroxide. If desired, the coupling may be carried out in the presence of a suitable solvent such as alcohol or pyridine.

When the coupling reaction is finished the monoazo-dyestuffs of the above constitution may, if desired, be isolated from the coupling mixture and freed from impurities. In general, however, for the treatment with the agent yielding metal the coupling mixture may be used as a whole without any intermediate isolation. As a rule it is necessary for this purpose, before carrying out the reaction with the agent yielding metal, to adjust the pH to a value favorable for the latter reaction.

As an agent yielding metal there may be used, for example, an agent yielding iron, nickel, cobalt or copper.

However, especially valuable products are obtained by using an agent yielding chromium.

The treatment of a monoazo-dyestuff of the Formula 1, in which the XO-group represents an alkoxy group, with an agent yielding metal is carried out under conditions such that the alkyl group X is split off. This is accomplished relatively easily by treating the dyestuff with the agent yielding metal, above all an agent yielding chromium, in an acid medium, for example, by heating the dyestuff with chromium sulfate or chromium formate in an aqueous acid medium in an open vessel for a longer time or by a shorter period of treatment under pressure at a raised temperature, for example a temperature ranging from 110° C. to 150° C.

The metalliferous monoazo-dyestuffs of the present process are new. They are complex metal compounds which contain one atom of metal bound in complex union with one molecule of a monoazo-dyestuff of the general formula

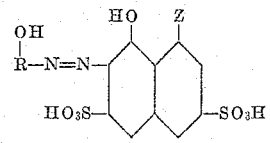

in which R represents a benzene radical free from sulfonic acid and carboxylic acid groups which is bound to the azo-linkage in ortho-position relatively to the HO-group and contains no nitro group in para-position relatively to the latter HO-group, and Z represents a sulfonic acid or a sulfonic acid amide group. Especially valuable are the chromium compounds of monoazo-dyestuffs of this kind, which contain as the radical R a benzene radical free from substituents containing nitrogen. They are suitable for dyeing or printing a very wide variety of materials, above all for dyeing animal textile fibers such as silk, leather and especially wool. The dyeings obtainable therewith are distinguished by their good fastness to alkalies, washing, fulling and light. Cellulose-containing materials, which may be present, for example, as effect threads in addition to wool, are hardly or not at all dyed by these chromium complexes. Furthermore, these new products as compared with known products of similar constitution, may be distinguished above all in that, even when they contain three sulfonic acid groups, they yield level dyeings having especially pure tints which maintain their purity even when viewed in artificial light.

The following examples illustrate the invention the parts and percentages being by weight:

Example 1

15.8 parts of 4-chloro-2-amino-1-methoxybenzene are diazotized in the usual manner in the presence of 28 parts of hydrochloric acid of 30 percent. strength with 7 parts of sodium nitrite. The filtered solution of the diazo-compound is run, while stirring well, into a solution, cooled to 10° C., of 39 parts of 1-hydroxynaphthalene-3:6:8-trisulfonic acid (used as the trisodium salt) and 40 parts of anhydrous sodium carbonate in 400 parts of water. The resulting dyestuff can be precipitated from solution by the addition of sodium chloride. It is a dark colored substance, when dry, which dyes wood red tints from acid baths.

This dyestuff is converted into the complex chromium compound without intermediate isolation. For this purpose there is added to the coupling mixture prepared as described above sulfuric acid of 10 percent. strength until the reaction is weakly mineral acid. After adding a quantity of chromium sulfate [Cr(OH)SO4] containing 5.7 parts of chromium, the reaction mixture is heated in a lead-lined autoclave fitted with stirring mechanism at 124–127° C., and stirred for 6 hours at that temperature. If desired, small amounts of impurities are filtered off, the filtrate is neutralized by the addition of about 18 parts of a sodium hydroxide solution of 30 percent. strength, and the whole is evaporated to dryness in vacuo. The dyestuff so obtained is, in the dry state, a dark colored substance which dyes wool from sulfuric acid baths fast reddish blue tints.

Example 2

18.8 parts of 1:4-dimethoxy-5-chloro-2-aminobenzene are diazotized in the usual manner in the presence of 46 parts of sulfuric acid of 38 percent. strength with 7 parts of sodium nitrite. The resulting clear solution of the diazo-compound is run, while stirring well, into a solution, cooled to 10° C., of 39 parts of 1-hydroxynaphthalene 3:6:8-trisulfonic acid (used as the trisodium salt) and 40 parts of anhydrous sodium carbonate in 400 parts of water. The dyestuff so obtained can be precipitated from solution by the addition of sodium chloride. When dry, it is a dark colored substance which dyes wool from acid baths bluish-red tints.

This dyestuff is converted into the complex chromium compound without intermediate isolation. For this purpose there is added to the coupling mixture obtained as described above sulfuric acid of 10 percent. strength until the reaction is weakly mineral acid. After the addition of a quantity of chromium sulfate [Cr(OH)SO4] containing 5.7 parts of chromium, the reaction mixture is heated in a lead-lined autoclave fitted with stirring mechanism at 124–127° C. and stirred for 4 hours at that temperature. If desired, small amounts of impurities are filtered off. The chromiferous dyestuff is separated from the filtrate by the addition of sodium chloride at the boil. In the dry state it is a dark colored substance which dyes wool from sulfuric acid baths fast blue tints, which exhibit practically the same tint when viewed in artificial light as in daylight.

Alternatively, the chroming operation may be carried out by boiling the reaction mixture for 24 hours in an open vessel under reflux.

A similar dyestuff is obtained by using, instead of 18.8 parts of 1:4-dimethoxy-5-chloro-2-aminobenzene as used in this example, 21.6 parts of 1:4-diethoxy-5-chloro-2-aminobenzene.

Example 3

14.4 parts of 4-chloro-2-amino-1-hydroxybenzene are diazotized in the usual manner in the presence of hydrochloric acid with 7 parts of sodium nitrite. The suspension of the diazo compound is added to a mixture, cooled to 5° C., of 40 parts of 1-hydroxynaphthalene-3:6:8-trisulfonic acid (used as the trisodium salt), 11 parts of potassium hydroxide and 50 parts of water. The reaction mixture is stirred until unchanged diazo compound can no longer be detected. The resulting dyestuff is precipitated by the addition of sodium chloride and hydrochloric acid and filtered off.

The dyestuff paste obtained in this manner is dissolved in 1000 parts of hot water, and the solution is rendered weakly mineral acid with sulfuric acid of 10 percent. strength. After the addition of a quantity of chromium sulfate [Cr(OH)SO4] containing 5.7 parts of chromium, the reaction mixture is boiled for 24 hours under reflux. If desired, the mixture is filtered to remove small amounts of impurities, the filtrate is neutralized by the addition of about 18 parts of a sodium hydroxide solution of 30 percent. strength, and the whole is evaporated to dryness in vacuo. The dyestuff so obtained has the same properties as the chromiferous dyestuff described in Example 1.

Example 4

16.8 parts of 5-nitro-2-amino-1-methoxybenzene are diazotized in the usual manner in the presence of hydrochoric acid with 7 parts of sodium nitrite. The solution of the diazo compound is added to a solution, rendered alkaline with sodium carbonate and cooled to 10° C., of 40 parts of 1-hydroxynaphthalene-3:6:8-trisulfonic acid. The dyestuff so obtained can be precipitated by the addition of sodium chloride and filtered off.

The latter dyestuff can be converted into the complex chromium compound without intermediate isolation. For this purpose there is added to the coupling mixture obtained as described above sulfuric acid of 10 percent strength until the reaction is weakly mineral acid. After the addition of a quantity of chromium sulfate

[Cr(OH)SO_4]

containing 5.7 parts of chromium, the reaction mixture is heated in a lead-lined autoclave fitted with stirring mechanism at 127–130° C. and the whole is stirred for 20 hours at that temperature. If desired, small amounts of impurities are filtered off. The chromiferous dyestuff is separated from the filtrate by the addition of sodium chloride at the boil. In the dry state it is a dark colored substance, which dyes wool from sulfuric acid baths fast blue tints, which exhibit practically the same tint when viewed in artificial light as in daylight.

If instead of using the diazo- and coupling components described in the previous examples there are used those given in the following table, there are obtained monoazo-dyestuffs the chromium complexes of which dye wool from sulfuric acid baths the tints mentioned in column III.

|   | Diazo-components | Coupling components | III |
|---|---|---|---|
| 1 | 4·6 - dichloro - 2 - amino-1-hydroxybenzene. | 1 - hydroxynaphthalene-3:6:8-trisulfonic acid. | reddish blue. |
| 2 | 6 - nitro - 4 - chloro - 2-amino - 1 - hydroxybenzene. | ----do---- | greenish blue. |
| 3 | 4 - methyl - 2 - amino - 1-hydroxybenzene. | 1 - hydroxynaphthalene-8-sulfamide-3:6-disulfonic acid. | reddish blue. |
| 4 | 5 - nitro - 4 - methyl - 2-amino - 1 - hydroxybenzene. | 1 - hydroxynaphthalene - 3:6:8-trisulfonic acid. | greenish blue. |

*Example 5*

100 parts of well wetted wool are entered at 40° C. into a dyebath which contains 2 parts of the chromiferous dyestuff obtainable as described in the first and second paragraphs of Example 1, 40 parts of sulfuric acid 10 percent strength and 3000 parts of water. The bath is slowly heated to the boil. After boiling for ¼ hour there are added a further 40 parts of sulfuric acid of 10 percent strength, and dyeing is continued at the boil for 1½ hours. The wool is then rinsed with cold water and dried. It is dyed a reddish blue tint.

What is claimed is:

1. A complex chromium compound containing one atom of chromium in complex union with a monoazo-dyestuff of the formula

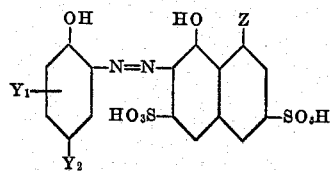

wherein $Y_1$ represents a member of the group consisting of a hydrogen and a chlorine atom, $Y_2$ represents a member of the group consisting of a chlorine atom and an alkoxy group containing up to two carbon atoms, and Z represents a member selected from the group consisting of sulfonic acid and sulfonic acid amide groups.

2. The complex chromium compound containing one atom of chromium in complex union with one molecule of the monoazo-dyestuff of the formula

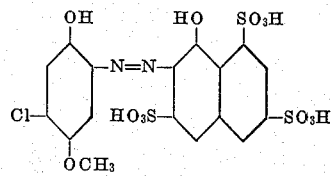

3. The complex chromium compound containing one atom of chromium in complex union with one molecule of the monoazo-dyestuff of the formula

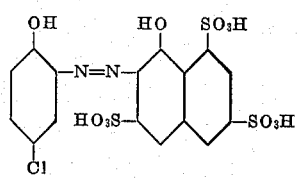

4. The complex chromium compound containing one atom of chromium in complex union with one molecule of the monoazo-dyestuff of the formula

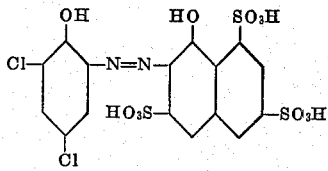

References Cited in the file of this patent

UNITED STATES PATENTS

| 458,284 | Kuzel | Aug. 25, 1891 |
| 1,540,666 | Thiess | June 2, 1925 |
| 2,171,828 | Hanhart et al. | Sept. 5, 1939 |
| 2,565,898 | Widmer et al. | Aug. 28, 1951 |
| 2,653,148 | Kehrer | Sept. 22, 1953 |

FOREIGN PATENTS

| 9,258 | Great Britain | of 1890 |